A. L. FRANKEBERGER.
BANANA HEATER AND RIPENER.
APPLICATION FILED OCT. 26, 1918.
Reissued Sept. 14, 1920. 14,948.
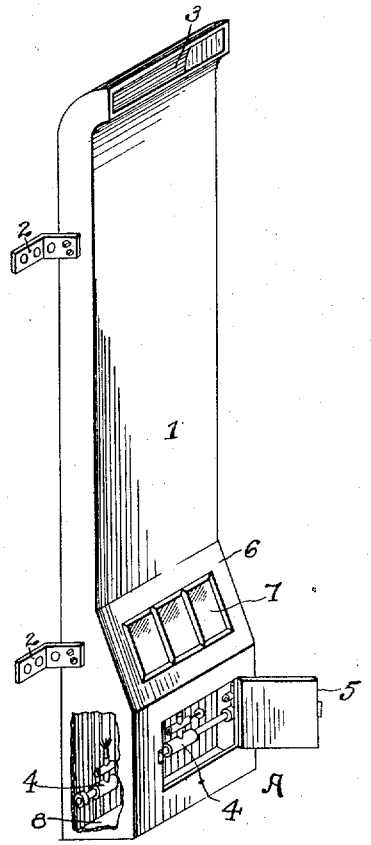
Inventor
A. L. Frankeberger
By Wallace R. Lane
Atty

UNITED STATES PATENT OFFICE.

ALBERT LESLIE FRANKEBERGER, OF BLOOMINGTON, ILLINOIS, ASSIGNOR TO ILLINOIS SPECIALTY MANUFACTURING COMPANY, OF McLEAN COUNTY, ILLINOIS, A CORPORATION.

BANANA HEATER AND RIPENER.

14,948. Specification of Reissued Letters Patent. Reissued Sept. 14, 1920.

Original No. 1,232,270, dated July 3, 1917, Serial No. 99,183, filed May 22, 1916. Application for reissue filed October 26, 1918. Serial No. 259,873.

*To all whom it may concern:*

Be it known that I, ALBERT LESLIE FRANKEBERGER, a citizen of the United States, residing at Bloomington, in the county of McLean and State of Illinois, have invented certain new and useful Improvements in Banana Heaters and Ripeners, of which the following is a specification.

My invention relates to an improvement in banana heaters and ripeners.

The object is to provide an appliance of the character mentioned, designed and preferably to be suspended from the wall for the discharge and circulation of heated air in the upper part of a room, so that an approximately uniform and equal distribution and circulation of warm air down through the bananas is provided.

It consists in an outer chamber in the lower end of which a heat is generated and through the restricted upper end of which the heated air circulates and from which it is discharged, there being a window at some intermediate point in the neighborhood of the heat generator for radiating the light.

The accompanying drawing is a view in perspective.

A is a heating chamber, and 1 is a flat, narrow flue which rises therefrom, and is preferably adapted to rest flat against a wall where it may be held by wall brackets 2.

The upper discharge end 3 of flue 1, preferably curves over from a vertical to a horizontal position, whereby to discharge and circulate the heated air at a point above the top of the bananas, so that the warm or heated air upon dropping will pass over and down through the bananas hung in the room, thus ripening them.

In the heating chamber, there are preferably three ordinary gas-burners 4, arranged centrally of the chamber, which is left entirely open at the bottom, as at 8, in order that the incoming air may circulate freely around the burners, thereby greatly increasing the efficiency of the heater. A door 5 opens into the side of the chamber, whereby to light the gas burners 4. In the sloping front 6 mica or other transparent windows 7 are provided for lighting the banana room, so that the gas or other jets serve the double purpose of heating and circulating the air, and also of lighting or illuminating the room.

A test of the work of the apparatus has shown that the temperature of the top of the room in which my improved heater has been placed was 74 degrees, while at the location of the lower end of the bunch of bananas, it was 68 degrees, and the floor was 54 degrees Fahr. Thus, the cold damp air is taken from the bottom of the room, heated, and then passed up over and discharged upon the top of the bananas. It has been found that one heater of suitable size is required for about one thousand cubic feet of air.

The heater is preferably so placed that the top or upper discharge end 3, is about eighteen inches above the top of the bananas, and the bottom of the heater is adapted to be the same height from the floor as the lower end of the bunch of bananas suspended in the room.

Thus, I produce an efficient appliance which has met the requirements of the fire regulations as well as proven satisfactory for the primary purpose for which it was designed.

Having now described my invention, I claim:—

1. A banana heater and ripener, comprising a chamber entirely open at the bottom thereof and provided with light and heat burners, a door communicating with said chamber and a comparatively thin flat flue extending vertically and having a horizontal discharge upper end, the front wall sloping from the heating chamber of the flue, but having transparent means therein for transmitting light from the burners within the heating chamber, and brackets attached to the vertical flue for fastening the heater upon the side wall of a room intermediate of the floor and ceiling.

2. In a unitary gas heater, comprising an inclosed heating chamber entirely open at the bottom thereof, and provided with heat burners, and a restricted flue extending vertically from the heating chamber, and having a horizontal discharge upper end, the heating chamber being formed with a sloping portion provided with transparent means for transmitting light from the burners within the heating chamber.

3. In a heater having a chamber open at bottom and top, and a gas burner located entirely within the chamber, a flat upright flue, thin in comparison with the chamber, having one end connected with the top of the chamber and its other end turned laterally to discharge heated air substantially horizontally with greater velocity than it enters the lower end of the heating chamber.

4. In a gas heater in combination, a heating chamber of substantial size having an intake opening, a thin, flat flue relatively small in cross-section in comparison with the heating chamber, having a substantially horizontal discharge at its upper end, the heating chamber being provided with an integrally sloping portion extending to the comparatively thin, flat flue, all formed integrally and so arranged as to provide a clear passage for heated air free of abrupt obstructions.

5. In a unitary gas heater, a heating chamber open at top and bottom, gas burners arranged therein, said chamber being provided with an intake opening below the burners and in the bottom of the chamber casing, a comparatively thin flat flue formed integrally with the heating chamber and extending vertically therefrom, and having a substantially horizontally directed discharge at its upper end whereby the cold air goes through the intake upwardly by the gas burners, and the generated heat passes through the discharge to produce a forced circulation in a room.

6. In a unitary gas heater, comprising an inclosed heating chamber, gas burners arranged therein, said chamber being provided with an intake opening below the burners, a comparatively thin flat flue of uniform cross-section formed integrally with the heating chamber and extending vertically therefrom, and having a substantially horizontal discharge at its upper end, the heating chamber being provided with an integrally sloping portion extending from the heating chamber to the comparatively thin flat flue.

In witness whereof, I hereunto subscribe my name to this specification, in the presence of two witnesses.

ALBERT LESLIE FRANKEBERGER.

Witnesses:

WM. M. BELT,

MARY BENNINGTON.